(12) United States Patent
Leino et al.

(10) Patent No.: US 7,164,958 B2
(45) Date of Patent: Jan. 16, 2007

(54) MODIFICATION PLANNING ARRANGEMENT

(75) Inventors: Jorma Leino, Jyväskylä (FI); Mikko Tähkäpää, Jyväskylä (FI); Laura Airaksinen, Muurame (FI)

(73) Assignee: Metso Paper, Inc., Helsinki (FI)

( * ) Notice: Subject to any disclaimer, the term of this patent is extended or adjusted under 35 U.S.C. 154(b) by 71 days.

(21) Appl. No.: 10/514,325

(22) PCT Filed: May 5, 2003

(86) PCT No.: PCT/FI03/00349

§ 371 (c)(1),
(2), (4) Date: Dec. 2, 2004

(87) PCT Pub. No.: WO03/096233

PCT Pub. Date: Nov. 20, 2003

(65) Prior Publication Data

US 2005/0160354 A1      Jul. 21, 2005

(30) Foreign Application Priority Data

May 13, 2002   (FI)   .................................. 20025022

(51) Int. Cl.
*G06F 7/00* (2006.01)
*G06F 19/00* (2006.01)

(52) U.S. Cl. ........................ 700/98; 700/100; 700/128; 715/502; 715/511; 709/246; 705/27

(58) Field of Classification Search ................ 700/128, 700/96, 97, 98, 100, 105, 127; 709/246, 709/231; 716/1, 11; 703/1, 22; 715/502, 715/511, 513; 707/9, 10; 705/26, 27, 28, 705/29

See application file for complete search history.

(56) References Cited

U.S. PATENT DOCUMENTS 6,026,430 A * 2/2000 Butman et al. ............. 709/203

(Continued)

FOREIGN PATENT DOCUMENTS

EP       0 558 006 A2       9/1993

(Continued)

OTHER PUBLICATIONS

Nevala, Kalevi, "The knowledge representations in paper machine design", Mar. 19, 2003, University of Oulu, http://cc.oulu.fi/~nevala/MentRepr%20in%20PM%20design.pdf.*

(Continued)

*Primary Examiner*—Kidest Bahta
*Assistant Examiner*—Charles Kasenge
(74) *Attorney, Agent, or Firm*—Stiennon & Stiennon

(57) ABSTRACT

A modification planning arrangement and method for a paper, board, finishing, or pulp machine, which includes as parties, a customer (10), a main supplier (11) and at least one sub-supplier (12), as well as a server linked to them over a telecommunications network. Each party has terminal equipment and software for viewing an image stored in the server and for communication in a data network. The image-viewing software has a mark-up function for attaching a mark-up to an image and for storing the mark-up in the server as its own mark-up file in connection with the image. The main supplier has a high-level CAD system to make and process an original drawing. The arrangement includes conversion and management software for the original drawings (CAD), for storing the drawings in concept form (HPGL, PDF) in a server (EDMS), and includes a mark-up data updating system, for distributing automatically to all parties.

13 Claims, 3 Drawing Sheets

U.S. PATENT DOCUMENTS

| | | | |
|---|---|---|---|
| 6,029,175 A | 2/2000 | Chow et al. | |
| 6,173,433 B1* | 1/2001 | Katoh et al. | 716/1 |
| 6,289,345 B1 | 9/2001 | Yasue | |
| 6,295,513 B1* | 9/2001 | Thackston | 703/1 |
| 6,834,312 B1* | 12/2004 | Edwards et al. | 709/246 |
| 6,999,907 B1* | 2/2006 | Smith | 703/1 |
| 2002/0069295 A1* | 6/2002 | Edwards et al. | 709/246 |

FOREIGN PATENT DOCUMENTS

| | | |
|---|---|---|
| GB | 2 321 324 A | 7/1998 |
| GB | 2 325 996 A | 12/1998 |
| WO | WO 03/096233 | 11/2003 |

OTHER PUBLICATIONS

"Cimmetry Systems' AutoVue Visualizes Product Data" Nov. 8, 2001 http://www.jvue.com/brochures/DHBA-VisualizationWhitepaper-2001-01-08.pdf.

International Search Report issued in PCT/FI03/00349.

International Preliminary Examination Report issued in PCT/FI03/00349.

* cited by examiner

MODIFICATION PLANNING ARRANGEMENT

CROSS REFERENCES TO RELATED APPLICATIONS

This application is a U.S. national stage application of international application No. PCT/FI03/00349, filed May 5, 2003, the disclosure of which is incorporated by reference herein, and claims priority on Finnish Application No. 20025022, Filed May 13, 2002.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to a modification planning arrangement for a paper or board machine, a finishing machine, or a pulp machine, which arrangement includes, as parties to it, a customer, a main supplier, and at least one sub-supplier, and a server connected to the parties over a telecommunications network. Each of the parties is equipped with terminal equipment and software for viewing an image stored in the server and for communication taking place over a data network, the image-viewing software including a mark-up function for attaching a mark-up to the image and for storing the mark-up in the server, as its own mark-up file connected to the image, and in which the main supplier has at its disposal a high-level computer-aided design (CAD) system, for creating original images.

Paper manufacturers have responded to the continual increase in paper consumption by increasing their production capacity and by allocating existing capacity to producing the paper grades, for which demand has increased. In addition, the development of printing technology has subjected paper grade properties to greater demands, which existing machines may be incapable of meeting. Investments in new machines tie up a great deal of capital, so that modifying, i.e. altering to meet the customer's requirements, existing machines used to manufacture paper grades, for which demand has dropped, is an important alternative to building an entirely new machine. Other factors leading to modification decisions include cutting production-process costs, increasing production, improving quality, and improving process safety.

The modification of machines and their constituent equipment often involves not only the actual main supplier, but also sub-suppliers, who supply components. The implementation of modifications can therefore involve several different parties, each with its own sub-area of responsibility and delivery target. Smooth and rapid implementation demands that all parties co-operate seamlessly and promptly and that the customer's production schedules are taken into account.

If the machine to be modified is located, for example, on another continent to the main supplier and sub-suppliers, problems will arise, particularly in scheduling the planning of the modification. All the suppliers participating in the planning must know, for example, what components they will be responsible for, as well as the components' dimensions and positions relative to both the other suppliers' components and to the existing equipment layout. For example, if one sub-supplier cannot supply a particular component, but must replace it with one of a different type or size, the sub-supplier concerned must send notification of the change to the main supplier, who must then in turn notify the other parties to the modification of the change. The changed plans may consequently create delivery problems for some other sub-suppliers, who will subsequently ask their own questions and/or alter the plan. If many changes are made to the plan, the main supplier's resources will be tied up for a long time to forwarding a diversifying series of changes and queries. For example, failure to notice how a change by one sub-supplier will affect another essential sub-supplier, and to inform it of the change, may lead to conflicts in the plan, and to even more time being wasted in resolving them. Thus, even achieving a final plan for the modification may take up to several months, as questions and answers to them slowly filter through from the parties at different times. Self-evidently, planning carried out in this way will delay the start of the modification and thus be extremely unprofitable to the paper manufacturer.

Network-assisted workgroup planning has been researched by several different entities—the following university-level research being available:

1) Salminen, Yassine, Riitahuhta: A Strategic Management Framework Collaborative Product Development, 4th International Conference on Engineering Design and Automation, ED & A, Orlando, Fla., USA, 30 Jul.–2 Aug. 2000.
2) Abramovici, et al., "Application of Product Data Management Technology for Enterprise-wide Distributed Product Development," in Jakucci et al. (eds.), "Globalization of Innovation, Agility and Virtual Enterprise," Conference PROLAMAT; Trento, Italy, 9–12 Sep. 1998.
3) Liston, Fischer, Kunz: "Requirements and Benefits of Interactive Information Workspaces in Construction," 8th International Conference on Computing in Civil and Building Engineering, Stanford University Silicon Valley, California, USA, August 2000.

The two first publications deal with the distribution of PDM (product data management) information in a data network and, on the other hand, in the various levels of subcontracting. The third concentrates on project planning in construction projects. The presentations are quite theoretical and are difficult to exploit in modifications of paper and pulp process equipment. It is not wished to distribute a large amount of information as such to all parties and, on the other hand, the bandwidth of the data network should be kept narrow. The processing of drawings forms an obvious bottleneck in known systems.

Cimmetry Systems, Inc., USA, has published the Auto-Vue® computer program, which allows 200 different image formats to be viewed over a network. In addition, the viewing program includes a so-called "mark-up" function, which allows mark-ups to be made on top of an image. A mark-up of this kind is stored as a file, which can be used by others immediately, if they have selected the use of the relevant function. Though in this case the mark-up file can be distributed, it is difficult to update it in a workgroup. Specific problems relate both to data security and to the limitations of the data network. The original drawings are in some high-level CAD format, for example, the CATIA or AutoCAD formats—often precisely in different formats. The program includes compressing data transfer. A considerable amount of inessential, but confidential information is connected to the original images, so that a workgroup system equipped with only the AutoVue® or similar viewing software is in no way ready for the intended planning task.

The OPTIWISE workgroup software developed by the Finnish company Stonesoft Oy permits network-based workgroup planning, in which a search can be made for factors relating to a product and its properties. The basic principles used are a product database and an intelligent user interface. In this case, the program can be used to quickly determine the critical factors, if it is wished to increase the paper web speed. However, this program cannot be used to process drawings, which is essential in modification planning.

SUMMARY OF THE INVENTION

The present invention is intended to achieve an arrangement, by means of which the aforementioned drawbacks can be avoided and which will allow modification planning to be concluded much more quickly than previously, in even a few hours. The arrangement according to the invention is characterized by the modification planning process taking place in real time over a data network, in such a way that the amount of data to be transferred is quite small. This condition is met, if concept drawings formed from the original drawings are used together with so-called compressing data transfer. In addition, the parties can make their dated mark-ups available for viewing by the other parties. The main supplier also has means for storing the concept drawing amended according to the various mark-ups, as a new base to be viewed by all parties.

According to one preferred embodiment, the customer may have a separate link to its own direct sub-supplier, in addition to its link to the main supplier. In the arrangement, each party, for example a sub-supplier, makes queries and mark-ups on a concept drawing, which the main supplier has made according to instructions received from the customer. During a real-time session, the main supplier makes updates on the basis of the exchange of information that takes place. The main supplier updates the suggested mark-ups and proposed changes on the concept drawing as required during the session, so that an increasingly detailed concept drawing becomes available as planning proceeds. The main supplier assembles the final modification plan from the plan shaped during the session and forwards it to the customer.

According to one preferred embodiment, the main supplier has a representative, generally a special expert, on the customer's premises, who has at their disposal a computer, preferably a laptop computer, with pre-installed software, particularly data-security programs and encryption parameters. Thus the customer need only arrange the data-network link. The terminal equipment, which is in the possession of the main supplier, on the customer's premises, naturally permits the freer storage of the planning material in this device. Particularly in this terminal equipment there may be a library of concept drawings, or data-security means for accessing such a library on the main supplier's server, over a public data network.

The use of the arrangement according to the invention permits a modification plan to be achieved substantially faster than before. The various parties have available, in electronic form and in nearly real time, a large number of technical documents, drawings, the other parties' specialist know-how, and other helpful material required in planning. The sub-suppliers receive real-time answers to questions concerning the sub-area they are supplying, either from the main supplier, or directly from the other parties. All alterations and mark-ups made by the sub-suppliers will reach their intended recipient with considerably greater certainty than in the present procedure, in which changes filter through one by one at irregular intervals, which may lead the main supplier to overlook something essential that should be forwarded. The general quality of deliveries will also improve. Savings accrue, not only in time, but also in traveling costs, as the sub-suppliers need not travel to the site to make checks and measurements. The arrangement according to the invention is especially suitable for modification planning in paper, board, finishing, and pulp machines, as this generally involves several parties and the drawings are often in CAD formats, which considerably hinders the known planning processes. With the aid of the invention, the quality of the modification planning is improved, the planning process is accelerated to a fraction of the previous time, and costs are reduced.

In the following, the invention is described in detail with the aid of examples, with reference to the accompanying drawings.

DESCRIPTION OF THE PREFERRED EMBODIMENTS

Figure 1:
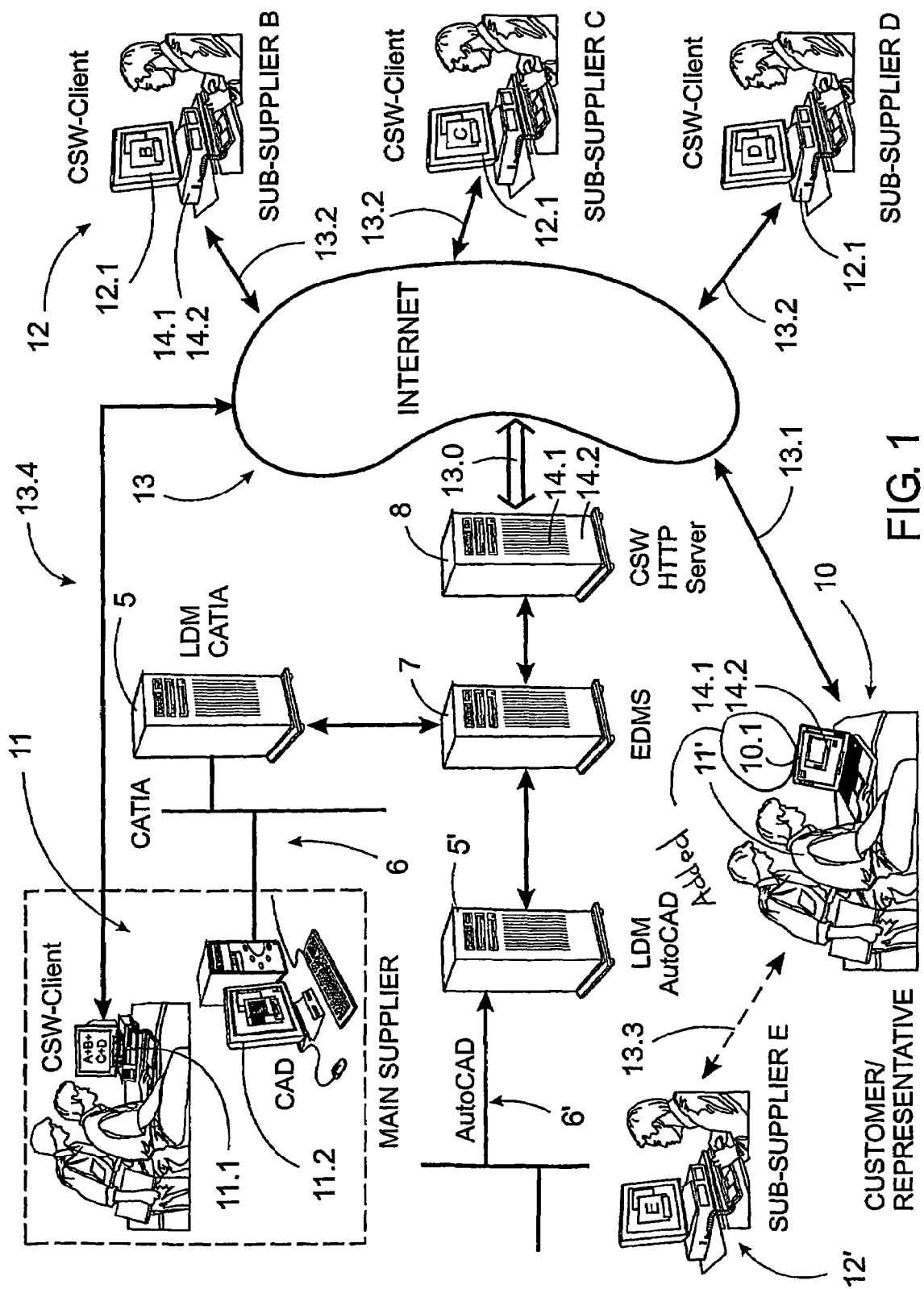
FIG. 1 shows a schematic diagram of the parties in the planning modification arrangement according to the invention.

FIG. 1 shows a schematic diagram of an example of an embodiment implementing the modification planning arrangement. The abbreviation CSW (Customer Solution Window) is used for the planning arrangement. The figure shows the parties participating in the method, these being a customer 10, a main supplier 11, sub-suppliers 12, and possibly the customer's 10 own direct sub-supplier 12', and the main supplier's 11 expert 11' (representative), as well as the setup of secure data-transfer links 13.0. 13.1, 13.2, 13.3, and 13.4 between them. The customer 10 can be, for example, a paper or board manufacturer, or a finisher, or even a pulp manufacturer; the main supplier 11 can be, for example, the supplier of a paper, board, finishing, or pulp machine; and the sub-suppliers 12 can be, for example, business partners of the main supplier 11, subcontractors or similar associated with the design department, who supply components. In this case, terminal equipment, in the possession of the representative of the main supplier and equipped with pre-installed security means and/or concept images, is available to the customer for use in planning.

The main supplier 11 is equipped with terminal equipment 11.1, in which there is software 14.1, 14.2, for communications over the data network 13 and for altering the modification plans, which permits the arrangement according to the invention. The main supplier 11 has at its disposal some form of CAD software and the original drawings. In this case, the CAD software is run using a second terminal equipment 11.2, but this could also be the same terminal equipment that is operated from the CSW application. The original drawings are arranged in such a way that each set of CAD software (in the figure, CATIA® and AutoCAD®) has its own logical data network 6, 6' and its own local server 5, 5' (LDM=local data manager) for storing drawings and other data. In terms of the present invention, it is essential that a viewing version is made of the drawings and that it is stored in a special server 7 (EDMS=Engineering data manager server). The CSW-HTTP server 8 is linked to the EDMS server 7, to distribute the concept drawings to the parties.

All the parties have a special viewing program, which in this case is marked with the name "CSW client." This is preferably the AutoVue®-JAVA program using an Internet browser (e.g. MS Internet Explorer® or Netscape®) equipped with a JAVA virtual machine, which is stored in the server 8 (CSW HTTP server).

The main supplier's 11 CSW-client program is also linked to the CSW server 8, either through a local area network, or, as shown here, over an Internet connection 13.4 (as are the CSW-client programs of the other parties 10, 12).

According to what is stated above, the communication software 14.1 preferably includes, for example, a Web browser equipped with a JAVA machine and a data transfer program. The actual modification planning takes place using a graphics program 14.2 (e.g., AutoVue®) that understands concept drawings. Preferably at least the customer 10 or the representative 11' on the customer's premises has at their disposal intelligent product-data software, for example, the aforesaid OPTIWISE software.

Because of their relatively small file sizes, concept-form drawings can be transferred quickly, even over slower telecommunications links. The entire plan (generally a sub-process) can be productized, so that it forms a pre-planned totality.

Both the customer 10 and each sub-supplier 12 has a terminal 10.1, 12.1, in which there is also software 14.1 for communication over the data network 13. To interpret the modification plans, the customer's 10 and the sub-suppliers' terminals 10.1, 12.1 have programs that understand the file format used by the main supplier 11. According to one preferred embodiment, the customer 10 can also be linked to its own direct sub-supplier 12', in such a way that the link is separate from the link 13.1, or that the sub-supplier 12' is on the customer's 10 premises. The parties may also have at their disposal a device suitable for communicating by radio, preferably, for example, a mobile station, which can be used for participation in a planning session in conditions, in which a landline network connection cannot be used.

The actual planning begins with the main supplier 11 placing an HTML page with a JAVA applet program in the CSW server 8 for each party to retrieve. The main supplier 11 or its representative 11' stores one or more concept drawings, which the other parties retrieve, in the selected location. The said AutoVue® program boots, from the selected HTML page, with parameters that include the default folders of the drawings and registers. Mark-ups made by the other parties are shown, if the user has selected the mark-up function. This echoing of mark-ups can operate, for example, as follows. An update-data register is placed in the server to record update notifications. Each party has an agent application, implemented with JAVA technology, which is arranged to use the server to check the said register at regular intervals and to trigger accordingly the mark-up data retrieval function of the viewing program. According to this, the agent instructs the viewing program to retrieve mark-up data or an updated concept image. A function of this kind can be connected to the AutoVue® program, through its API interface.

The main user 11 (and/or the representative 11') preferably has at their disposal a JAVA applet program, which can be used to renew the concept image viewed by all the parties, i.e. the drawing can be updated.

Concept drawings in some suitable viewing format (size 100 kByte–1 MByte) are made from high-level CAD drawings (with a size of up to hundreds of megabytes). Such formats are, for example, the HPGL and PDF formats. Often a design engineer will crop the selected part of a larger image required for the modification project and store it in a selected directory in the EDMS server, which is available to the CSW-HTTP server. Compressing data transfer will reduce the amount of data to be transferred for each image to the range 50–100 kByte.

Figure 2:
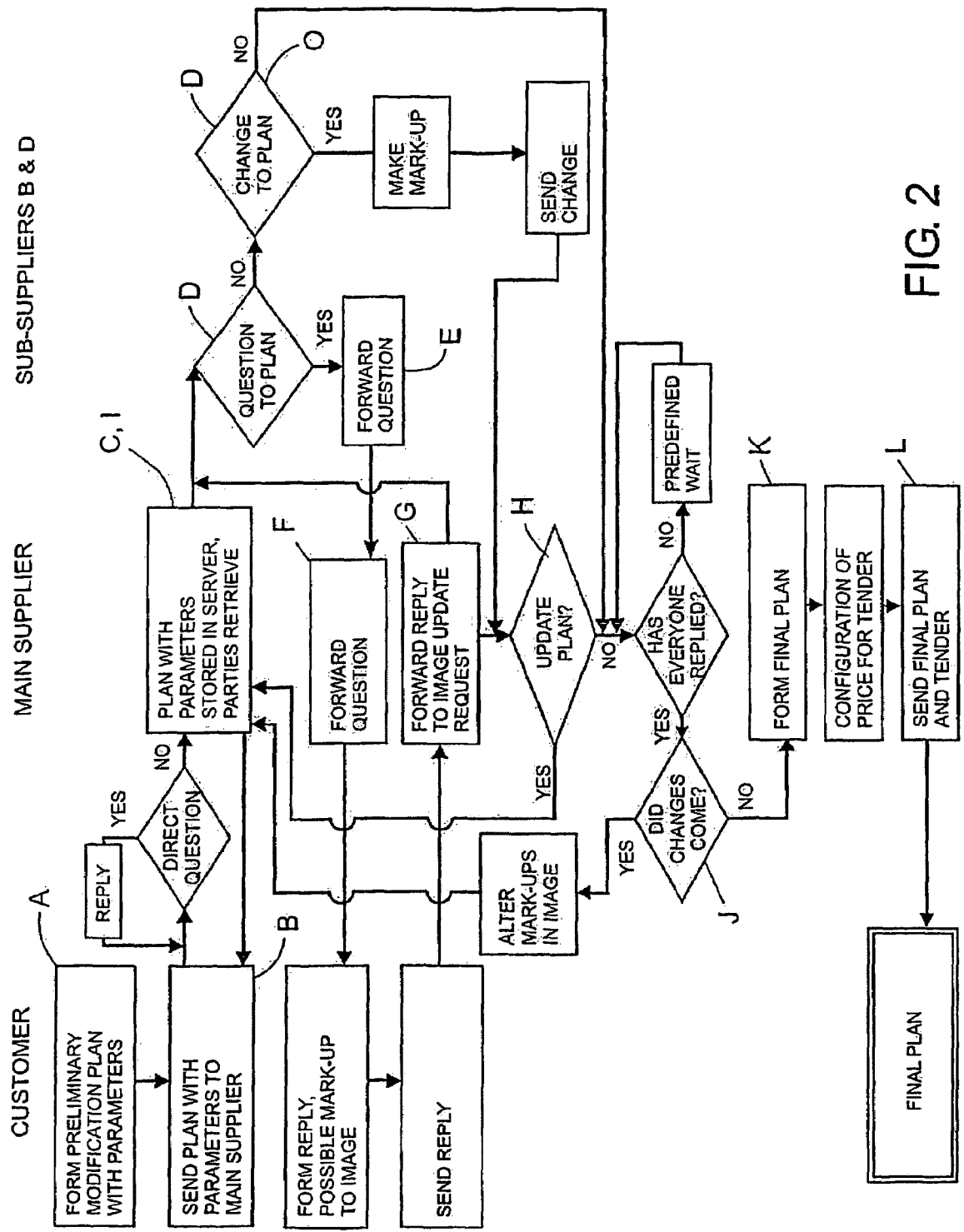
FIG. 2 shows a flow diagram of the planning modification arrangement according to the invention.

In the following, the arrangement according to the invention is examined with the aid of the flow diagram shown in FIG. 2, which shows the general terms according to which a modification planning session according to the arrangement can proceed. Before the procedure shown in the flow diagram, a preparatory stage for the actual planning session takes place. The customer 10, for example, a paper manufacturer, needs to make alterations to one of its machines, because, for example, in its present form the machine cannot cope with changes to be made in the properties of the paper produced. As much information as possible on the customer's 10 machine and equipment, such as drawings, manuals, parts lists, operating logs, on-line data on the states of availability and runnability, machine and process analysis results, information on similar previous modifications, and other possible material is converted and stored in electronic form (drawings e.g. in CAD format), unless this has been done already, and is then transferred to a database 11.2 in the main supplier's 11 computer. Part of the aforesaid information may also comprise know-how that the main supplier 11 has gained from similar modifications that it has delivered previously. The main supplier 11 and the customer 10 also conduct preliminary discussions on the plan and its implementation. When it makes the plans, the customer 10 may also be able to use its terminal 10.1 to access information on the main supplier's 11 latest technology, and may be in contact with a representative 11' of the main supplier 11, with whom it co-operates in the creation (A) of a preliminary modification plan. In the next stage, the customer 10 and the main supplier's representative 11' send the main supplier 11 the objectives of the modification, in the form of a preliminary plan, which includes a preliminary concept drawing, which the main supplier's representative 11' has made on a modular level, and which does not include, for example, any of the plan's structural dimensions (B). In general, the objectives can be, for example, to increase production, to increase efficiency and speed, and related sub-objectives. The main supplier 11 may send direct queries and make the preliminary plan more specific by taking into account the customer's 10 requirements and existing machine concept, to improve the modification by asking the customer 10 questions.

Once the customer's 10 requirements and wishes have been noted and possible changes have been made to the plan, the main supplier 11 invites to a real-time planning session, not only the customer 10 and the main supplier's representative 11' who may be present on the customer's premises, but also one or more of the sub-suppliers 12 participating in the project. The main supplier 11 will have chosen the sub-suppliers 12 on grounds defined by the component deliveries and installations relating to the equipment to be modified. The customer 10 may also invite to the session its own direct sub-supplier 12', which communicates only with the customer 10, or is present on the customer's 10 premises. This direct sub-supplier 12' of the customer's 10 may be, for example, a piping contractor, which will construct the part of the new piping that remains the responsibility of the customer 10.

The preliminary plan, preferably in the form, for example, of a concept drawing made at a modular level, is sent over secure data-transfer links to both the customer 10 and its sub-suppliers 12, who have software 14.2 for interpreting such drawings using their own terminals 10.1, 12.1. The sub-suppliers 12 view the solutions of the modification plan on their terminals 12.1, either as the entire plan, or as sub-solutions concerning only their own deliveries.

Once they have received the preliminary plan, the sub-suppliers 12 can obtain more specific information, by asking questions (D). The questions are sent (E) to the main supplier 11, who will forward (F) them to the relevant entities, to whose area of operations the questions relate, or who will reply itself, if the question relates to the main supplier's 11 own area of operations. If the customer 10, for example, can answer the question, it will find the answer immediately, for instance, by going to the device to measure the exact dimensions of the relevant object. Once it has found the answer, the customer 10 sends it at once to the main supplier 11, who forwards (G) it to the questioner and to any other relevant parties who are assumed to be affected by the answer. Apart from sending queries to the customer 10 and the main supplier 11, the sub-suppliers 12 can also send them to other sub-suppliers 12.

If, instead of, or as well as asking questions, some party needs to make mark-ups to its part of the plan, (e.g., a different distance between components to that in the plan), it makes a mark-up in the concept plan and stores it in the server, so that it can be viewed immediately by the others (with the aid of each party's JAVA agent program).

At the discretion of the main supplier and possibly at the request of some party, the main supplier 11 makes an alteration, according to the mark-up data, in the original drawing, converts it to a concept drawing, and stores it to be available to all the others.

The exchange of information between the parties 10, 11, 12 can take place, for example, by transferring graphic, documentary, or audiovisual data, for instance by using software that allows the simultaneous viewing of drawings and the exchange of text or audio-based data.

If, during a round of planning, a change (mark-up) comes from even one party, the main supplier 11 may decide not to update the change yet in the original drawing (H) and the planning is continued with the mark-up layer shown in the figure. At the main supplier's discretion, the mark-ups are updated in a new concept drawing (J, I).

If, on the other hand, during the most recent planning round, no questions or changes to the plan have come from any of the sub-suppliers 12 or from the customer 10, the plan can be assumed to have achieved its final form. Thus, during the session, the preliminary modification plan comes to correspond to the customer's 10 requirements, while the exchange of information between the main supplier 11, the sub-suppliers 12, and the customer 10, and the planning process progress. The main supplier 11 works out a final modification plan (K) from the modular concept plan formed during the session. According to one preferred embodiment, when assembling the final modification plan, the main supplier 11 uses a sales configurator integrated with the arrangement to help determine the price of the plan and to form a tender. The final modification plan, which may include a modular concept drawing or 3D model in addition to a written tender, is sent by the main supplier 11 over a secure data-transfer link 13.1 to the customer 10 (L). The tender includes a technical specification, which incorporates an operating description and itemizes the components to be supplied, the extent of the delivery, the works, the date and price of the delivery, and other possible terms and conditions.

In the modification plan, working drawings are not used, but expressly simpler concept drawings, which are in, for example, HPGL or PDF format. The main supplier's representative 11' has preferably a module library at his disposal, which allows a preliminary concept design for each machine to be made quickly on site. The main supplier has at its disposal a comprehensive product data management (PDM) database.

Figure 3:
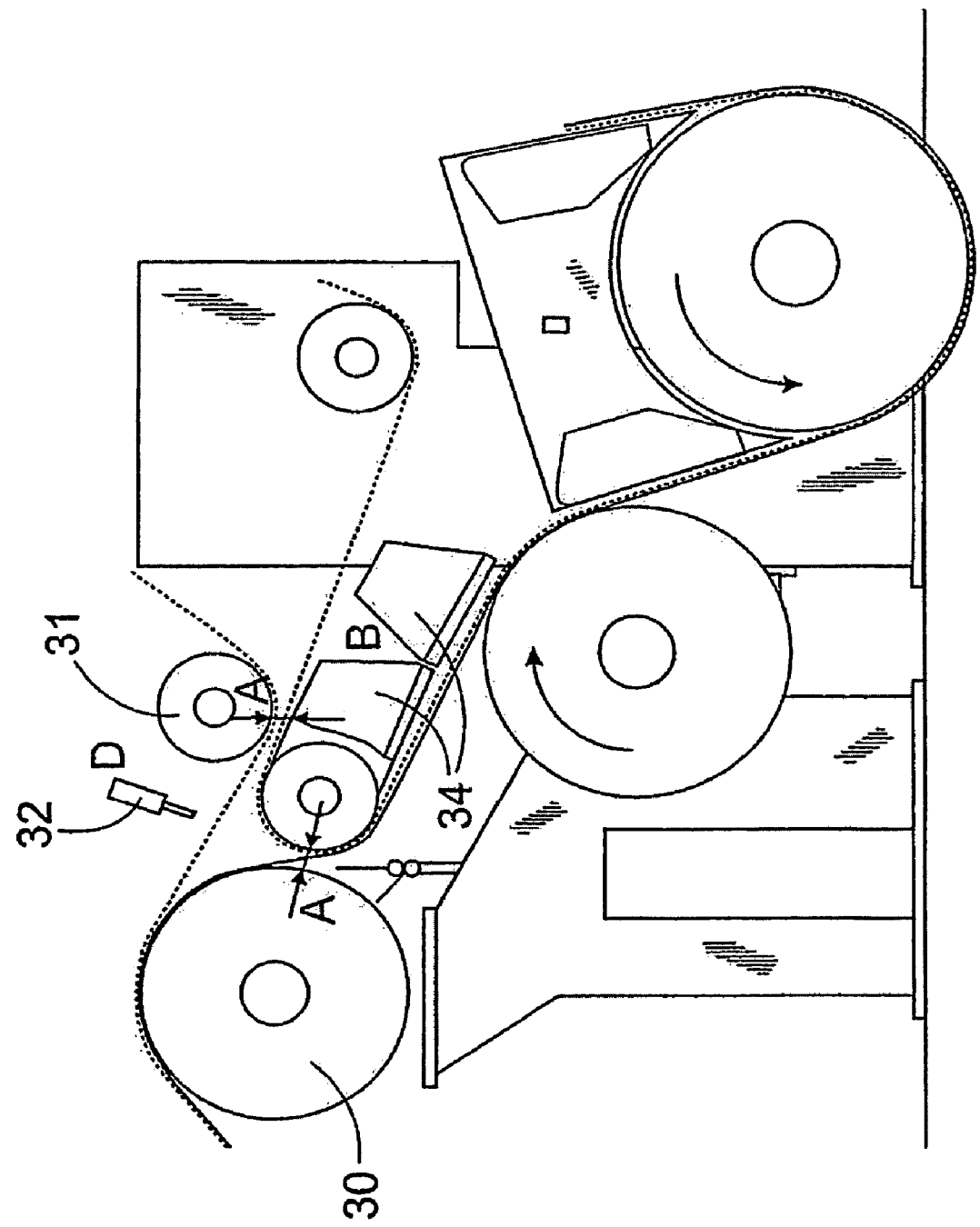
FIG. 3 shows an example of an application of an embodiment of the modification planning arrangement.

FIG. 3 shows an example of an equipment rebuild application, in which the arrangement according to the invention can be advantageously applied. The example relates to the rebuild of a press section, by which the customer 10 hopes to achieve, for instance, increased speed and reduced paper web porosity through improved runnability. The main supplier 11 has chosen a sub-supplier B, which will supply the blower boxes 34 for the press, to participate in the modification project. Sub-supplier C has been chosen to supply the air curtain beam and the doctor lubrication jet. Sub-supplier D will supply a laser measuring device 32 for measuring the web's separation point. The main supplier 11 will take care of moving the felt guide roll 31 and the center roll 30.

According to the arrangement according to the invention, the various sub-suppliers ask questions and make changes to their own equipment deliveries, by utilizing, in real time, the expertise of the other participants in the session. Generally the questions may relate to work safety, the energy requirements of the various devices, the quality and amount of the available electricity and compressed air, and the space available for positioning the various devices. Further questions may arise regarding the availability and models of the devices included in the plan. For example, sub-supplier D may begin to worry about the safety regulations affecting the laser device, which vary from country to country. The questions may concern the automatic control and shielding of the laser device, for instance, when must the laser device be kept switched off, etc. The main supplier 11 may want to know the distance between the felt guide roll and the center roll. Sub-supplier C may have a question concerning the dimensions of the space reserved for the air curtain beam and the doctor lubrication jet pipe. The customer 10 can reply to this immediately, after first taking the required measurements from the machine. If the above questions are settled while all the parties are linked to each other in real time through the main supplier 11, the modification plan can be completed much faster than by using the present planning method, even in as little as a few hours.

By using the modification planning arrangement according to the invention, quality will improve and assumptions will be fewer. In principle, the JAVA technology can be replaced with Microsoft®'s ActiveX system, though this will require all the parties to use one of this manufacturer's operating systems.

The invention claimed is:

1. A modification planning arrangement for a paper, board, finishing, or pulp machine, which includes as parties to the arrangement, a customer, a main supplier and at least one sub-supplier, as well as a server linked to them over a telecommunications network, wherein each one of said parties is equipped with terminal equipment and software for viewing an image stored in the server and for communication taking place in a data network, the image-viewing software including a mark-up function for attaching a mark-up to an image and for storing the mark-up in the server as its own mark-up file in connection with the image, and in which the main supplier has at its disposal a high-level computer-aided design system, in order to make and process an original drawing, the improvement comprising:

the arrangement includes conversion and management software for the original drawing, for storing the necessary drawing in concept form in a selected server, and that the arrangement includes a mark-up data updating system for distributing it automatically to all the parties;

wherein the data-network has connections over a secure data-transfer link; and a sales configurator integrated with the planning arrangement to determine at least in part a price of a final modification plan and to form a written tender, the final modification plan including a modular concept drawing or 3D model, and the written tender is sent by the main supplier over the secure data-transfer link to the customer, the tender including a technical specification, which incorporates an operating description and itemizes the components to be supplied, the extent of delivery, works, and the date and price of the delivery.

2. The modification planning arrangement of claim 1, wherein the data-network connections are mainly the Internet.

3. The modification planning arrangement of claim 2 wherein the viewing program and the updating function are JAVA® applications, which are arranged to operate in connection with a browser.

4. The modification planning arrangement of claim 3, wherein the updating function includes the following components:

an update-data register located in the server, for storing an update notification; and an agent application for each party, which is arranged to check the said register in the server at regular intervals and to trigger the mark-up data retrieval function of the viewing program accordingly.

5. The modification planning arrangement of claim 2 wherein at least the main supplier has an application for distributing automatically to the parties a new concept image formed from a corrected CAD image.

6. The modification planning arrangement of claim 1, wherein the main supplier has a product data system, and wherein at least one party in addition to the main supplier has at its disposal the main supplier's product data system, in addition to the image viewing software.

7. The modification planning arrangement of claim 1, wherein the customer's terminal equipment comprises a main supplier's representative's laptop computer, in which data security means are pre-installed.

8. The modification planning arrangement of claim 7 wherein the data security means comprises software and encryption parameters.

9. The modification planning arrangement of claim 1, wherein the arrangement includes means by which the customer is connected, separately relative to the other parties, to its own subcontractor.

10. The modification planning arrangement of claim 1 wherein the format of the drawings stored in concept form is HPGL or PDF.

11. A method in the modification planning of a paper, board, finishing, or pulp machine, which includes as parties a customer, a main supplier, and at least one sub-supplier, and in which the planning takes place interactively as a simultaneous session between the parties, in such a way that the parties have at their disposal software and terminal equipments suitable for viewing and marking-up concept images and also for sending conversational/text messages, comprising the steps of:

the parties transmitting information to each other with the aid of said software and terminal equipments, the information including mark-up data and said messages, in such a way that the main supplier assembles a final plan at the end of the session, with the aid of the exchange of information, and wherein said mark-up data is automatically distributed to all parties by a mark-up data updating system;

using a sales configurator with the method to determine at least in part a price of the final plan and to form a written tender, the final plan including a modular concept drawing or 3D model, and the written tender is sent by the main supplier over a secure data-transfer link to the customer, the tender including a technical specification, which incorporates an operating description and itemizes the components to be supplied, the extent of delivery, works, and the date and price of the delivery; and providing to at least the customer, for the customer's planning use, terminal equipment in the possession of a representative of the main supplier with pre-installed security means.

12. The method of claim 11, further comprising the step of making available to at least the customer at the session a product database created beforehand by the main supplier and concerning the subject of the modification.

13. The method of claim 11, further comprising the step of creating at least one concept image from a high-level CAD drawing, so that, with the aid of the mark-ups and information exchange made during the session, the main supplier creates a new concept image by making changes in the original drawing and converting said changed original drawing into a new concept image.

* * * * *